United States Patent
Itaya et al.

[15] 3,666,789
[45] May 30, 1972

[54] CYCLOPROPANECARBOXYLIC ACID ESTERS

[72] Inventors: Nobushige Itaya, Minoo-shi; Katsuzo Kamoshita, Toyonaka-shi; Toshio Mizutani, Hirakata-shi; Shigeyoshi Kitamura, Toyonaka-shi; Shinji Nakai; Nobuyuki Kameda, both of Takarazuka-shi; Keimi Fujimoto, Higashiyama-ku, Tyoto; Yositosi Okuno, Toyonaka-shi, all of Japan

[73] Assignee: Sumitomo Chemical Company, Ltd., Osaka, Japan

[22] Filed: May 21, 1969

[21] Appl. No.: 827,490

[52] U.S. Cl..........................260/468, 260/340.5, 260/469, 424/305
[51] Int. Cl..........................................C07c 69/00
[58] Field of Search..............................260/468 P

[56] References Cited

UNITED STATES PATENTS 3,509,180  4/1970  Elliott....................260/468

FOREIGN PATENTS OR APPLICATIONS 1,926,433  12/1969  Germany..................260/468

Primary Examiner—Alex Mazel
Assistant Examiner—James H. Turnipseed
Attorney—Stevens, Davis, Miller & Mosher

[57] ABSTRACT

Novel cyclopropanecarboxylic acid esters having an excellent insecticidal activity and harmless property to mammals and cattles, of the formula

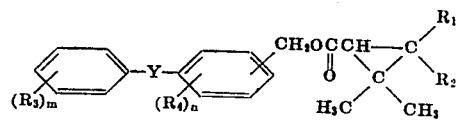

wherein Y is oxygen or sulfur atom, $R_1$ is hydrogen atom or methyl group, $R_2$ is methyl, 2-methyl-1-propenyl, 2-methoxycarbonyl-1-propenyl, phenyl or 3,4-methylenedioxyphenyl group when $R_1$ is hydrogen atom, or methyl group when $R_1$ is methyl group, $R_3$ and $R_4$ are same or different and are a halogen atom or methyl group, and $m$ and $n$ are 0 or an integer of 1 to 3, and the carboxylic acid ester is prepared by esterifying the derivatives of corresponding phenoxybenzyl or phenylthiobenzyl compounds with the carboxylic acids or their derivatives.

9 Claims, No Drawings

CYCLOPROPANECARBOXYLIC ACID ESTERS

The present invention relates to a new cyclopropanecarboxylic acid ester having insecticidal activities and a method for the production thereof. The present invention further relates to an insecticidal composition containing said novel ester.

PRIOR ART

As an insecticide having insect-knock-down and killing ability as well as harmless property to mammals and cattles, there have been hitherto used pyrethrum extracts including pyrethrin, and is sold on market recently a synthetic insecticide such as allethrin which is a homologue of pyrethrin and 3,4,5,6-tetrahydrophthalimidomethyl chrysanthemate (referred to as "tetramethrin" hereinafter). However, none of them satisfies at present time all of the desired conditions, showing drawback in some points and advantage in the other.

After studying to obtain new effective esters, the inventors have found a new type ester which is remarkably excellent in insecticidal activity as compared with the above pyrethrin and its homologue and is prepared at low costs. Thus, the present invention is achieved.

OBJECT

An object of the present invention is to provide a new carboxylic acid ester having more excellent insecticidal activity at low costs.

CHEMICAL COMPOUNDS

According to the present invention, a novel cyclopropanecarboxylic acid ester is provided, said ester having the following formula

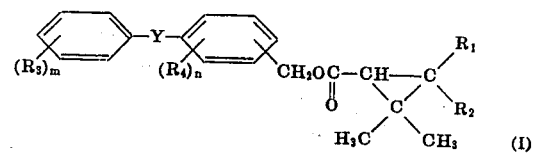

wherein Y is oxygen or sulfur atom, $R_1$ is hydrogen atom or methyl group, $R_2$ is methyl, 2-methyl-1-propenyl, 2-methoxycarbonyl-1-propenyl, phenyl or 3,4-methylenedioxyphenyl group when $R_1$ is a hydrogen atom, or methyl group when $R_1$ is methyl group, $R_3$ and $R_4$ are same or different and are a halogen atom or methyl group, and $m$ and $n$ are 0 or an integer of 1 to 3.

It will be appreciated that the novel ester of the formula (I) includes naturally its optically active isomers which occur due to the asymmetric carbon atom possibly present in the carboxylic acid moiety such as d-trans-crysanthemum-monocarboxylic acid residue.

Among the esters represented by the formula (I), the especially useful ones that are not limitative in the present invention, are enumerated as follows:

| Compound Number | Structure |
|---|---|
| (1) | 3-phenoxybenzyl chrysanthemate. |
| (2) | 4-phenoxybenzyl chrysanthemate. |
| (3) | 2-phenoxybenzyl chrysanthemate. |
| (4) | 3-phenoxybenzyl 2,2,3,3-tetramethylcyclopropanecarboxylate. |
| (5) | 4-phenoxybenzyl 2,2,3,3-tetramethylcyclopropanecarboxylate. |
| (6) | 3-phenoxybenzyl pyrethrate. |

| Compound Number | Structure |
|---|---|
| (7) | 4-phenoxybenzyl pyrethrate. |
| (8) | 3-phenoxybenzyl 2,2-dimethyl-3-phenylcyclopropanecarboxylate. |
| (9) | 3-phenoxybenzyl 2,2-dimethyl-3-(3',4'-methylenedioxy)phenylcyclopropanecarboxylate. |
| (10) | 3-(p-chlorophenoxy)benzyl chrysanthemate. |
| (11) | 2-chloro-5-phenoxybenzyl chrysanthemate. |
| (12) | 3-(2',4'-dichlorophenoxy)benzyl chrysanthemate. |
| (13) | 3-(2'-chlorophenoxy)benzyl chrysanthemate. |
| (14) | 2,6-dichloro-3-phenoxybenzyl chrysanthemate. |

| Compound Number | Structure |
|---|---|
| (15) | 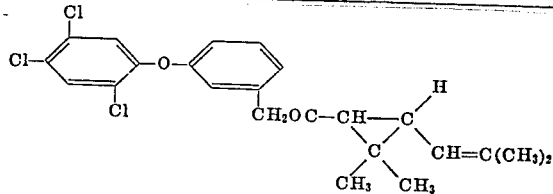
3-(2',4',5'-trichlorophenoxy)benzyl chrysanthemate. |
| (16) | 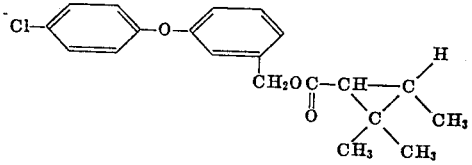
3-(p-chlorophenoxy)benzyl 2,2,3-trimethylcyclopropanecarboxylate. |
| (17) | 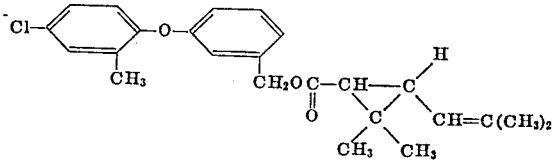
3-(2'-methyl-4'-chlorophenoxy)benzyl chrysanthemate. |
| (18) | 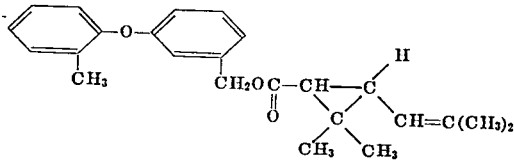
3-(o-tolyloxy)benzyl chrysanthemate. |
| (19) | 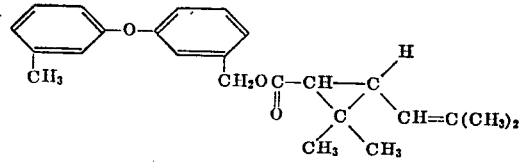
3-(m-tolyloxy)benzyl chrysanthemate. |
| (20) | 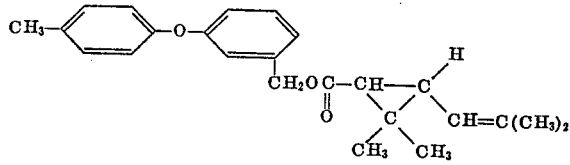
3-(p-tolyloxy)benzyl chrysanthemate. |
| (21) | 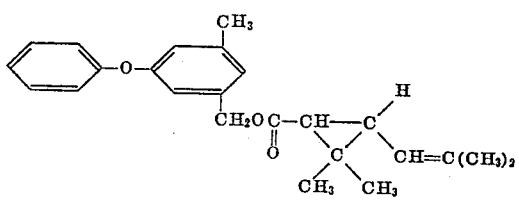
3-methyl-5-phenoxybenzyl chrysanthemate. |
| (22) | 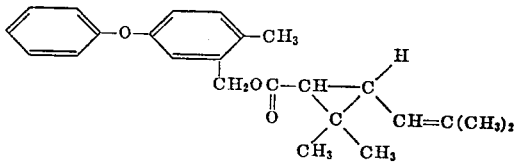
2-methyl-5-phenoxybenzyl chrysanthemate. |

| Compound Number | Structure |
|---|---|
| (23) | 3-(2',3'-xyloxy)benzyl chrysanthemate. |
| (24) | 3-(3',4'-xyloxy)benzyl chrysanthemate. |
| (25) | 3-(3',-5'-xyloxy)benzyl chrysanthemate. |
| (26) | 3-phenylthiobenzyl chrysanthemate. |
| (27) | 3-phenylthiobenzyl-2,2,3,3-tetramethylcyclopropane carboxylate. |
| (28) | 3-phenylthiobenzyl pyrethrate. |
| (29) | 3-phenylthiobenzyl-2,2-dimethyl-3-phenylcyclopropane carboxylate. |
| (30) | 3-p-tolylthiobenzyl chrysanthemate. |
| (31) | 3-m-tolylthiobenzyl chrysanthemate. |

| Compound Number | Structure |
|---|---|
| (32) | 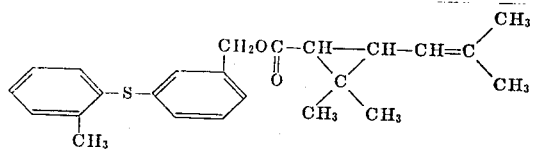 3-o-tolylthiobenzyl chrysanthemate. |
| (33) | 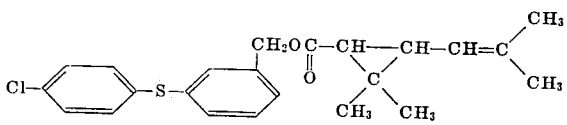 3-p-chlorophenylthiobenzyl chrysanthemate. |

USE OF THE COMPOUND

The cyclopropanecarboxylic acid ester of formula (I) has an excellent activity for killing insects such as houseflies, mosquitoes, cockroaches and the like, and can be used not only in a wide scope of the prevention of epidemics but also controlling insects injurious to stored cereals, agriculture, especially crops before harvest, household horticulture, green-house cultivation and food-packaging, without anxiety due to its low toxicity.

PROCESS FOR PRODUCTION OF COMPOUND

The carboxylic acid ester of formula (I) is prepared for the first time by the present inventors, and is obtained easily and in good yield, for example, by method comprising reacting a diphenylether derivative of the formula

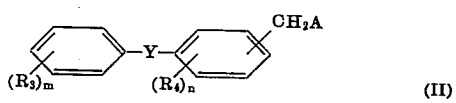

wherein Y, $R_3$, $R_4$ and $m$ and $n$ are same as defined above, and A is a halogen atom or hydroxy or tosyloxy group, with a cyclopropane carboxylic acid of the formula

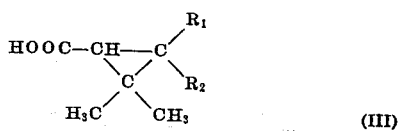

wherein $R_1$ and $R_2$ are same as defined above, or its reactive derivatives, in the presence of suitable reaction-auxiliary agent, if necessary.

The diphenylether derivative of formula (II) used in the method of the present invention is selected in such a relation of the other reactant, cyclopropane carboxylic acid and its reactive derivatives of formula (III) as to enable it to be subjected to esterification. The reactive derivatives of the carboxylic acid of formula (III) means corresponding acid halide, acid anhydride, lower alkyl ester or salt. The following disclosure will explain more particularly the method of the preparation of the cyclopropanecarboxylic acid ester of formula (I) according to the present invention.

The first embodiment of the method is to obtain the objective ester by reacting as the diphenyl ether derivative an alcohol of the formula

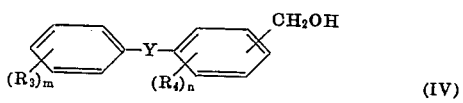

wherein Y, $R_3$, $R_4$, and $m$ and $n$ are same as defined above, with the cyclopropane-carboxylic acid of formula (III), halide, anhydride or lower alkyl ester thereof. When the acid itself is used, the reaction is completed under the condition of dehydration. Thus, the reaction is carried out by heating in the presence of dehydration catalyst such as mineral acids and para-toluene sulfonic acid or azeotropic solvent such as benzene and toluene. Alternatively, the reaction may be carried out in an inert solvent such as benzene, petroleum ether, containing a dehydrating agent such as dicyclohexylcarbodiimide with or without heating.

When the acid halide is used, the reaction is effected well at the room temperature in the presence of an organic tertiary amine such as pyridine, triethylamine and the like as a dehydrogen halide agent. The acid halide used may be any ones, but acid chloride is usually used. In the reaction, the use of solvents is preferable to allow the reaction to proceed smoothly, and an inert solvent such as benzene, toluene and petroleum benzine is preferably used.

When the acid anhydride is used as the reactant, the reaction can proceed without any reaction-auxiliary agent well at the room temperature to form the objective ester of formula (I). The warming of the reaction system and the use of solvents are favourable for allowing reaction to proceed smoothly, but they are not always indispensable.

When the lower alkyl ester is used as the reactant, the reaction is completed in the presence of a basic catalyst such as sodium alkoxide under heating condition, and proceeds smoothly by the use of an inert solvent such as benzene, toluene and the like. The preferable lower alkyl ester used in the present method includes methyl ester, ethyl ester, n-propyl ester, isopropyl ester and n-butyl ester, of the cyclopropanecarboxylic acid of formula (III).

The second embodiment of the process of the present invention is to prepare the objective ester of formula (I) from halides of the diphenyl ether of the formula

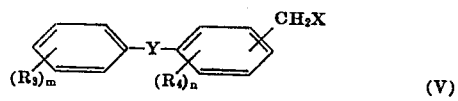

wherein X is a halogen atom, and Y, $R_3$, $R_4$ and $m$ and $n$ are same as defined above. The another reactant is the salts of the carboxylic acid of formula (III) with alkali metals or tertiary amines, which salts may be formed in situ in the reaction by adding the corresponding bases forming such salts to the reaction mixture. The reaction is preferably carried out in the presence of an inert solvent such as benzene, acetone and the like at a temperature of the boiling point or the lower of the solvents for allowing the reaction to proceed. Among the halogen atoms presented by X in formula (V), chlorine or bromine atom is, in general, common, but other halogen atoms may be selected optionally.

The third embodiment of the method of the present invention is to obtain the objective ester of formula (I) from a tosylates of the diphenyl ether of the formula

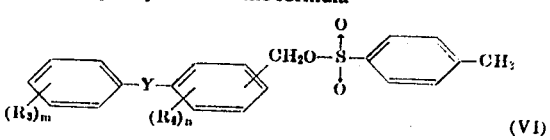

wherein Y, $R_3$, $R_4$ and $m$ and $n$ are same as defined above. In this case, the another reactant is those same as used in the second embodiment, and the reaction condition is also same as that used therein.

STARTING MATERIALS

The cyclopropanecarboxylic acids of formula (III) used as the reactant according to the present invention can be prepared by already known process, and, if necessary, may be converted to each of the reactive derivatives according to well known method. The alcohols represented by formula (IV) are easily prepared by reducing corresponding carboxylic acid ester or hydrolyzing corresponding halides of formula (V) and the halides may be prepared with good yield by halogenating the side chain of corresponding toluenes. The tosylates of formula (VI) may also easily be prepared by reacting the alcohols of formula (IV) with p-toluene sulfonyl chloride.

It will be appreciated that the carboxylic acid of formula (III) and its derivatives may include optically active isomers, such as d-trans-chrysanthemic acid and reactive derivatives thereof.

INSECTICIDAL COMPOSITION

In the preparation of insecticidal compositions, the new esters of formula (I) may be formulated into any desired forms of oil sprays, emulsifiable concentrates, dusts, wettable powders, aerosols, mosquito coils, fumigants, granules, baits and luring dust or solid preparation, according to known method in the art applied to the pyrethrum extracts, allethrin and the like, using auxiliary agents and/or carriers for common insecticidal compositions, although the solution of the ester in organic solvent such as xylene and methylnaphthalene is sometimes convenient.

The insecticidal compositions thus formed may be increased in its activity when used in admixture with a synergist for pyrethroid such as 3,4-methylenedioxy-6-propylbenzylbutyldiethylene glycolether (hereinafter referred to as "-piperonylbutoxide"), 1,2-methylenedioxy-4-[2-(octylsulfinyl)-propyl]-benzene (hereinafter referred to as "sulfoxide"), N-(2-ethylhexyl)-bicyclo[2,2,1]hepta-5-ene-2,3-dicarboximide (hereinafter referred to as "MGK–264," registered trade name for said imide produced by McRolin Gormley King Co.), N-(4-pentynyl)-phthalimide or o-n-propyl-0-propargylphenyl phosphonate. (hereinafter referred to NIA–16388). When the present compounds are formulated into mosquito coils, the activity can be increased by incorporation of a known additive therefor, such as terephthalic or isophthalic acid and butyl hydroxytoluene (referred to as BHT). In addition, the present compounds may be formulated into multi-purpose compositions by incorporation of other active ingredients such as pyrethroids, for example, pyrethrum extracts, allethrin, tetramethrin, 5-benzyl-3-furylmethyl chrysanthemate; organic chloride insecticides, for example, dichlorodiphenyltrichloromethane (referred to as "DDT"), benzene hexachloride (referred to as "BHC") and methoxychlor; organic phosphor insecticides, for example, 0,0-dimethyl 0-(3-methyl-4-nitrophenyl) phosphorothioate (hereinafter referred to as "Fenitrothion"), 0,0-dimethyl 0-(2,2-dichlorovinyl) phosphate (referred to as "DDVP"); carbamate type insecticides, for example, 1-naphthyl-N-methylcarbamate and 3,4-xylyl-N-methylcarbamate; or other insecticides, fungicides, acaricides, herbicides, fertilizers or other agricultural chemicals.

The present invention will be more particularly illustrated by the following Examples which should not restrict the invention defined in the attached claims.

EXAMPLES 1 – 34

Production of the Cyclopropanecarboxylic Acid Esters

The esters of the present invention shown in Table 1 were produced by standard processes each represented by A, B, C, D, E and F as follows:

Process A : The Reaction of the Alcohol of the Formula (IV) with the Carboxylic Acid Halide.

In a solution of 0.05 mol. of the alcohol in 3 times by volume of dry benzene 0.075 mol. of pyridine is added. To the solution, there is added a solution containing 0.053 mol. of the carboxylic acid chloride in its 3 times by volume of dry benzene at a time to react under generation of heat. After allowed to stand over a night with tightly sealing, the reaction mixture is added with a slight amount of water to dissolve pyridine hydrochloride precipitation, and the aqueous layer formed is removed. The organic layer is successively washed with an aqueous solution containing 5 percent by weight of hydrochloric acid and a saturated aqueous solution of sodium hydrogencarbonate, and a saturated aqueous solution of sodium chloride and dried over anhydrous sodium sulfate, and distilled to remove benzene. The residual liquid is subjected to silica gel chromatography to recover the purified objective ester in the form of pale yellow oil.

Process B : The Dehydration Reaction between the Alcohol of Formula (IV) with the Carboxylic Acid of Formula (III).

To a solution of 0.05 mol. each of the alcohol and the carboxylic acid in 3 times by volume of benzene, 0.08 mol. of dicyclohexylcarbodiimide is added while stirring, and the reaction mixture is allowed to stand over a night, with tightly sealing. Next day, the reaction is completed by refluxing for 2 hours, and then the objective ester is recovered by the procedures same as described in Process A.

Process C : The Reaction of the Alcohol of Formula (IV) with the Carboxylic Acid Anhydride.

To a solution of 0.05 mol. of the alcohol in 3 times by volume of toluene, 0.055 mol. of the carboxylic acid anhydride prepared by reaction of the carboxylic acid of formula (III) with acetic anhydride, is added, heated at 100° C. for 3 hours to complete the reaction. After cooled, the reaction mixture is neutralized with 10 per cent aqueous solution of sodium hydroxide at a temperature of not higher than 10° C. and the carboxylic acid resulted from the reaction is recovered as sodium salt thereof from the aqueous layer. The organic layer is treated by the procedure same as described in Process A, and the objective ester is thus obtained.

Process D : The Ester Interchange Reaction between the Alcohol of Formula (IV) with the Lower Alkyl Ester of the Carboxylic Acid.

To a solution of 0.06 mol. of ethyl ester of the carboxylic acid of formula (III) and 0.05 mol. of the alcohol in 5 times by volume of dried toluene, 0.005 mol. of sodium ethoxide is added. The reaction system is well stirred and refluxed for 10 hours to complete the reaction, while removing the formed ethanol as azeotropic mixture from the top of the rectification column. After adding water carefully, the objective ester is recovered from the organic layer by the procedures same as described in Process A.

Process E : The Reaction of the Halide of Formula (IV) with the Carboxylic Acid of Formula (III).

A solution of 0.05 mol. of the halide and 0.06 mol. of the carboxylic acid in 3 times by volume of acetone is warmed at 15° to 20° C., and is added dropwise with a solution of 0.08 mol. of triethylamine in 3 times of volume of acetone over a time of 1 hour while stirring. After the addition, the reaction system is refluxed for 2 hours to complete the reaction and cooled. The precipitating triethylamine hydrochloride is filtered off. The filtrate is distilled to remove acetone. Three times by volume of benzene is added to the remaining liquid. The organic layer is treated by the procedures same as described in Process A, to obtain the objective ester.

Process F : The Reaction of the Tosylate of Formula (VI) with Salt of the Carboxylic Acid of Formula (III).

To a solution of 0.05 mol. of the tosylate in 3 times by volume of acetone, 0.06 mol. of the sodium carboxylate which has been prepared by reacting the carboxylic acid and sodium hydroxide in water and distilling off water to obtain a dry mass, is added at a room temperature over a time of 30 minutes while stirring. The reaction system is refluxed for 30 minutes to complete the reaction, and cooled. A precipitation formed is filtered off, and the filtrate is distilled to remove the acetone. The remaining is dissolved in 3 times by volume of benzene, and the objective ester is recovered from the organic liquid by the procedures as described in Process A.

According to the above-mentioned standard processes, resulting esters are each shown in the following Table 1 from the starting materials which are also shown therein.

TABLE 1

Yielding cyclopropanecarboxylic ester

| Example No. | Starting material — Diphenylether derivative | Starting material — Cyclopropanecarboxylic acid or its derivative | Process | Compound | Theoretical yield (percent) | Refractive index ($n_D^{25}$) | Elementary analysis (percent) Calculated | | | | Elementary analysis (percent) Found | | | |
|---|---|---|---|---|---|---|---|---|---|---|---|---|---|---|
| | | | | | | | C | H | Cl | S | C | H | Cl | S |
| 1 | 3-phenoxybenzyl alcohol | dl-cis, transcrysanthemummonocarboxylic acid chloride | A | 3-phenoxybenzylchrysanthemate | 93 | 1.5483 | 78.8 | 7.48 (for $C_{23}H_{26}O_3$) | — | — | 78.5 | 7.62 | — | — |
| 2 | 4-phenoxybenzyl alcohol | dl-cis, transcrysanthemummonocarboxylic acid | E | 4-phenoxybenzylchrysanthemate | 87 | 1.5511 | 78.8 | 7.48 (for $C_{23}H_{26}O_3$) | — | — | 79.0 | 7.50 | — | — |
| 3 | 2-phenoxybenzyl alcohol | dl-cis, transcrysanthemummonocarboxylic acid anhydride | C | 2-phenoxybenzylchrysanthemate | 91 | 1.5465 | 78.8 | 7.48 (for $C_{23}H_{26}O_3$) | — | — | 78.7 | 7.51 | — | — |
| 4 | 3-phenoxybenzyl alcohol | 2,2,3,3-tetramethyl cyclopropane carboxylic acid chloride | A | 3-phenoxybenzyl-2,2,3,3-tetramethylcyclopropanecarboxylate | 92 | 1.5442 | 77.8 | 7.46 (for $C_{23}H_{26}O_3$) | — | — | 77.7 | 7.48 | — | — |
| 5 | 4-phenoxybenzyl alcohol | 2,2,3,3-tetramethylcyclopropanecarboxylic acid | B | 4-phenoxybenzyl 2,2,3,3-tetramethylcyclopropanecarboxylate | 86 | 1.5470 | 77.8 | 7.46 (for $C_{21}H_{22}O_3$) | — | — | 77.9 | 7.59 | — | — |
| 6 | 3-phenoxybenzyl alcohol | dl-trans, transpyrethric acid chloride | A | 3-phenoxybenzyl pyrethrate | 94 | 1.5612 | 73.1 | 6.64 (for $C_{24}H_{26}O_5$) | — | — | 73.1 | 6.66 | — | — |
| 7 | 4-phenoxybenzyl alcohol | dl-trans, transpyrethric acid | B | 4-phenoxybenzyl pyrethrate | 87 | 1.5642 | 73.1 | 6.64 (for $C_{24}H_{26}O_5$) | — | — | 72.9 | 6.67 | — | — |
| 8 | 3-phenoxybenzyl alcohol | dl-cis, trans-2,2-dimethyl-3-phenylcyclopropane carboxylic acid chloride | A | 3-phenoxybenzyl 2,2-dimethyl-3-phenylcyclopropanecarboxylate | 90 | 1.5830 | 80.6 | 6.50 (for $C_{23}H_{26}O_3$) | — | — | 80.4 | 6.53 | — | — |
| 9 | 3-phenoxybenzyl alcohol | dl-cis, trans-2,2-dimethyl-3-(3',4'-methylene dioxy) phenylcyclopropanecarboxylic acid anhydride | C | 3-phenoxybenzyl 2,2-dimethyl-3-(3',4'-methylene dioxy)phenylcyclopropanecarboxylate | 85 | 1.5882 | 75.0 | 5.81 (for $C_{26}H_{24}O_5$) | — | — | 74.8 | 5.88 | — | — |
| 10 | 3-(4'-chlorophenoxy)benzyl alcohol | dl-cis, trans-chrysanthemummonocarboxylic acid chloride | A | 3-(4'-chlorophenoxy)benzyl chrysanthemate | 92 | 1.5563 | 71.8 | 6.50 9.23 (for $C_{23}H_{25}ClO_3$) | | — | 71.7 | 6.52 | 9.38 | — |
| 11 | 2-chloro-5-phenoxybenzyl alcohol | do | A | 2-chloro-5-phenoxybenzyl chrysanthemate | 90 | 1.5555 | 71.8 | 6.50 9.23 (for $C_{23}H_{25}ClO_3$) | | — | 71.6 | 6.50 | 9.10 | — |
| 12 | 3-(2',4'-dichlorophenoxy)benzyl alcohol | do | A | 3-(2',4'-dichlorophenoxy)benzyl chrysanthemate | 87 | 1.5644 | 6.59 | 5.73 17.0 (for $C_{23}H_{24}Cl_2O_3$) | | — | 65.7 | 5.79 | 16.9 | — |
| 13 | 3-(2'-chlorophenoxy)benzyl alcohol | do | A | 3-(2'-chlorophenoxy)benzyl chrysanthemate | 87 | 1.5458 | 71.8 | 6.50 9.23 (for $C_{23}H_{25}ClO_3$) | | — | 71.7 | 6.53 | 9.28 | — |
| 14 | 2,6-dichloro-3-phenoxybenzyl alcohol | do | A | 2,6-dichloro-3-phenoxybenzyl chrysanthemate | 93 | 1.5640 | 65.9 | 5.73 17.0 (for $C_{23}H_{24}Cl_2O_3$) | | — | 65.7 | 6.01 | 17.2 | — |
| 15 | 3-(2',4',5'-trichlorophenoxy)benzyl alcohol | do | A | 3-(2',4',5'-trichlorophenoxy)benzyl chrysanthemate | 88 | 1.5786 | 60.9 | 5.07 23.5 (for $C_{23}H_{23}Cl_3O_3$) | | — | 61.2 | 5.13 | 23.4 | — |
| 16 | 3-(4'-chlorophenoxy)benzyl alcohol | dl-cis, trans-2,2,3-trimethylcyclopropanecarboxylic acid chloride | A | 3-(4'-chlorophenoxy)benzyl 2,2,3-trimethylcyclopropanecarboxylate | 89 | 1.5538 | 69.7 | 6.10 10.3 (for $C_{20}H_{21}ClO_3$) | | — | 70.3 | 6.14 | 10.1 | — |
| 17 | 3-(2'-methyl-4'-chlorophenoxy)benzyl alcohol | dl-cis, transcrysanthemummonocarboxylic acid chloride | A | 3-(2'-methyl-4'-chlorophenoxy)benzyl chrysanthemate | 92 | 1.5525 | 72.3 | 6.78 8.91 (for $C_{24}H_{27}ClO_3$) | | — | 71.9 | 6.80 | 8.94 | — |
| 18 | 3-(o-tolyloxy)benzyl | ethyl dl-cis, transcrysanthemummonocarboxylate | D | 3-(o-tolyloxy)benzyl chrysanthemate | 84 | 1.5582 | 79.1 | 7.74 (for $C_{24}H_{25}O_3$) | — | — | 79.7 | 7.80 | — | — |
| 19 | 3-(m-tolyloxy)benzyl | dl-cis, transcrysanthemummonocarboxylic acid chloride | A | 3-(m-tolyloxy)benzyl chrysanthemate | 94 | 1.5453 | 79.1 | 7.74 (for $C_{24}H_{28}O_3$) | — | — | 78.6 | 7.75 | — | — |
| 20 | 3-(p-tolyloxy)benzyl | sodium dl-cis, transcrysanthemummonocarboxylate | F | 3-(p-tolyloxy)benzyl chrysanthemate | 89 | 1.5450 | 79.1 | 7.74 (for $C_{24}H_{28}O_3$) | — | — | 79.3 | 7.78 | — | — |
| 21 | 3-methyl-5-phenoxybenzyl alcohol | dl-cis, transcrysanthemummonocarboxylic acid chloride | A | 3-methyl 5-phenoxybenzyl chrysanthemate | 90 | 1.5462 | 79.1 | 7.74 (for $C_{24}H_{28}O_3$) | — | — | 79.5 | 8.21 | — | — |
| 22 | 2-methyl-5-phenoxybenzyl alcohol | d-cis, trans-crysanthemummonocarboxylic acid chloride | A | 2-methyl-5-phenoxybenzyl d-trans-chrysanthemate | 93 | 1.5472 | 79.1 | 7.74 (for $C_{24}H_{28}O_3$) | — | — | 80.2 | 7.74 | — | — |
| 23 | 3-(2',3'-xyloxy)benzyl chloride | 3-phenylthiobenzyl chrysanthemate | A | 3-phenylthiobenzyl chrysanthemate | 94 | 1.5472 | 75.4 | 7.48 (for $C_{24}H_{28}O_3$) | — | — | 79.3 | 7.49 | — | — |
| 24 | 3-(3',4'-xyloxy)benzyl alcohol | 2,2,3,3-tetramethylcyclopropanecarboxylic acid | E | 3-phenylthiobenzyl 2,2,2,3-tetramethylcyclopropane carboxylate | 89 | 1.5742 | 74.1 | 7.2 8.7 (for $C_{21}H_{24}O_2S$) | | — | 75.1 | 7.2 | 8.7 | 9.0 |
| 25 | 3-(3',5'-xyloxy)benzyl alcohol | dl-trans, transpyrethric acid | B | 3-phenylthiobenzyl pyrethrate | 88 | 1.5862 | 70.2 | 6.4 7.8 (for $C_{25}H_{30}O_4S$) | | — | 80.1 | 7.2 | 9.4 | 9.6 |
| 26 | 3-phenoxybenzyl alcohol | dl-cis, trans-2,2-dimethyl-3-phenylcyclopropanecarboxylic acid chloride | A | 3-phenoxybenzyl 2,2-dimethyl-3-phenylcyclopropanecarboxylate | 90 | 1.6077 | 77.3 | 6.2 (for $C_{25}H_{30}O_3S$) | — | — | 76.9 | 6.7 | 8.1 | 9.6 |
| 27 | 3-phenylthiobenzyl alcohol | dl-trans, trans-chrysanthemic acid chloride | A | 3-phenylthiobenzyl chrysanthemate | | | | | | | | | | | |
| 28 | 3-phenylthiobenzyl chloride | 2,2,3,3-tetramethylcyclopropanecarboxylic acid | E | 3-phenylthiobenzyl 2,2,3,3-tetramethylcyclopropanecarboxylate | | | | | | | | | | | |
| 29 | 3-phenylthiobenzyl | dl-trans, transpyrethric acid | B | 3-phenylthiobenzyl pyrethrate | | | | | | | | | | | |
| 30 | do | dl-cis, trans-2,2-dimethyl-3-phenylcyclopropanecarboxylic acid chloride | A | 3-phenylthiobenzyl 2,2-dimethyl-3-phenylcyclopropanecarboxylate | 90 | 1.6077 | 77.3 | 6.2 (for $C_{25}H_{30}O_3S$) | — | — | 76.9 | 6.5 | 8.4 | 8.4 |
| 31 | 3-p-tolylthiobenzyl alcohol | dl-cis, trans-chrysanthemic anhydride | C | 3-p-tolylthiobenzyl chrysanthemate | 85 | 1.5702 | 75.7 | 7.4 8.4 (for $C_{24}H_{28}O_2S$) | | — | 75.7 | 7.3 | — | 9.0 |

Table 1—Continued

| Example No. | Starting material — Diphenylether derivative | Starting material — Cyclopropanecarboxylic acid or its derivative | Process | Yielding cyclopropanecarboxylic ester — Compound | Theoretical yield (percent) | Refractive index ($n_D^{25}$) | Elementary analysis (percent) Calculated C | H | Cl | S | Found C | H | Cl | S |
|---|---|---|---|---|---|---|---|---|---|---|---|---|---|---|
| 32 | 3-m-tolylthiobenzyltosylate | Sodium dl-cis, transchrysanthemate | F | 3-m-tolylthiobenzylchrysanthemate | 83 | 1.5705 | 75.7 | 7.4 | | 8.4 (for $C_{24}H_{28}O_2S$) | 74.9 | 7.5 | | 8.8 |
| 33 | 3-o-tolylthiobenzyl alcohol | dl-cis, transchrysanthemic acid chloride | A | 3-o-tolylthiobenzylchrysanthemate | 89 | 1.5831 | 75.7 | 7.4 | | 8.4 (for $C_{24}H_{28}O_2S$) | 75.4 | 7.4 | | 8.6 |
| 34 | 3-p-chlorophenylthiobenzyl alcohol | Ethyl dl-cis, transchrysanthemate | D | 3-p-chlorophenylthiobenzyl chrysanthemate | 82 | 1.5802 | 68.9 | 6.3 | 8.8 (for $C_{23}H_{25}ClO_2S$) | 8.0 | 69.1 | 6.5 | 9.5 | 7.8 |

[$\alpha$]$_D^{21}$ —12.83 (chloroform).

Preparation of Insecticidal Composition and Test Data thereof

The ester used is represented by the compound number previously mentioned, and parts are by weight.

EXAMPLE 35

0.05 part of the present compounds (1), (4) and (6), respectively, was dissolved in kerosene to make 100 parts. Three oil spray were thus obtained.

EXAMPLE 36

0.2 part of the present compounds (2), (5), (7), (8) and (10), respectively, and 0.8 part of piperonyl butoxide were dissolved in kerosene to make 100 parts. Five oil sprays containing 0.2 per cent by weight of the present compounds and 0.8 per cent by weight of a synergist, butoxide, were thus obtained, respectively.

EXAMPLE 37

0.2 part of the present compounds (16) and (20), respectively, and 0.8 part of NIA-16388 were dissolved in kerosene to make 100 parts. Two oil sprays containing 0.2 per cent by weight of the present compounds and 0.8 per cent by weight of a synergist, NIA-16388, were thus obtained, respectively.

EXAMPLE 38

20 parts of the present compounds (1), (2), (3), (4), (5), (6), (7), (8), (10), (12), (13), (15), (16), (17), (18), (19), (20), (23), (24) and (25), respectively, 10 parts of Sorpol SM-200 (registered trade name for an emulsifier sold by Toho Chemical Co.) and 70 parts of xylene were mixed well under stirring. Twenty emulsifiable concentrates each containing 20 per cent by weight of the present compound were thus obtained, respectively.

EXAMPLE 39

0.6 g of the present compounds (1), (4), (5), (6), and d-trans-chrysanthemate of (1) and (19), respectively, were dissolved in 20 ml of methanol. The solutions were homogeneously mixed with 99.4 g of a mosquito coil carrier consisting of a mixture of Tabu powder, Pyrethrum marc and wood powder in the ratio of 3 : 5 : 1, and methanol is evaporated. The remainings were added with 150 ml. of water, kneaded thoroughly, and shaped into mosquito coils and dried. Thus, six mosquito coils each containing 0.6 per cent of the active compound were thus obtained, respectively.

EXAMPLE 40

0.2 part of the present compound (1), 0.2 part of Tetramethrin were dissolved in a mixture of 7 parts of xylene and 7.6 parts of deodorized kerosene. The solution was filled in an aerosol container. After attaching a valve portion to the container, 85 parts of a propellant (e.g. liquefied petroleum gas) was charged therein under pressure through said valve. An aerosol was thus obtained.

EXAMPLE 41

0.4 part of the present compound (4) was dissolved in a mixture of 7 parts of xylene and 7.6 parts of deodorized kerosene under stirring. An aerosol was thus obtained from the solution by the procedures as described in Example 40.

EXAMPLE 42

0.3 part of the present compound (6) and 0.3 part of Fenitrothion were dissolved in a mixture of 7 parts of xylene and 7.4 parts deodorized kerosene with stirring. An aerosol was thus obtained from the solution according to the procedures as described in Example 40.

EXAMPLE 43

0.3 part of the present compound (7), 0.2 part of Tetramethrin, 13.5 parts of deodorized kerosene and 1 part of Atmos 300 (a registered trade name for an emulsifier sold by Atlas Chemical Co.) were mixed and added with 50 parts of pure water to make emulsion. The emulsion was filled in an aerosol container together with 35 parts of a mixture of deodorized propane and butane in a ratio of 1 : 3.

A water-based aerosol was thus obtained.

EXAMPLE 44

1 part of the present compounds (1), (4) and (6), respectively, was dissolved in 20 parts of acetone. To the solution, 99 parts of 300 mesh diatomaceous earth were added. The mixtures were thoroughly mixed individually by means of a mortar, and acetone was evaporated. Three dusts were thus obtained, respectively.

EXAMPLE 45

5 parts of the present compound (1), 5 parts of Toyolignin CT (an excipient, registered trade name sold by Toyo Boseki Co.) and 90 parts of GSM Clay (a registered trade name for Clay sold by Zieklite Mining Co.) were thoroughly mixed by means of a mortar. Then, the mixture was added with 10 per cent by weight of water basing on the weight of the mixture and further mixed well. The thus obtained mixture was granurated by means of a granulator, and air-dried. A granulator, preparation was thus obtained.

EXAMPLE 46

To an uniform mixture of 25 parts of the present compound (4) and 5 parts of Sorpol SM–200, 70 parts of 300 mesh talc were added and thoroughly mixed by means of a mortar. A wettable powder was thus obtained.

EXAMPLE 47

1.5 g of the present compounds (9), (11), (12), (13), (14), (17), (19), (21) and (22), respectively, were dissolved in 20 ml.of methanol, and the solutions were mixed homogeneously with 98.5 g of the mosquito coil carrier as described in Example 39, and methanol was evaporated. The residues were added with 150 ml of water, thoroughly kneaded, shaped into mosquito coil and dried. Nine mosquito coils each containing 1.5 per cent by weight of the active ingredients were thus obtained, respectively.

EXAMPLE 48

0.2 part of each of the present compounds (26), (27), (28), (30) and (32), respectively, was dissolved in kerosene to make 100 parts, whereby a corresponding oil spray was obtained.

EXAMPLE 49

A mixture of 0.1 part of the present compound (29) and 0.4 part of piperonyl butoxide was dissolved in kerosene to make 100 parts, whereby an oil spray was obtained.

EXAMPLE 50

A mixture of 0.1 part of the present compound (31) and 0.4 part of sulfoxide was dissolved in kerosene to make 100 parts, whereby an oil spray was obtained.

EXAMPLE 51

A mixture of 0.1 part of the present compound (33) and 0.4 part of MGK–264 was dissolved in kerosene to make 100 parts, whereby an oil spray was obtained.

EXAMPLE 52

A mixture of 15 parts of the present compound (26), 3 parts of DDVP, 10 parts of Sorpol SM–200 (registered trade mark for an emulsifier produced by Toho Chemical Co.) and 72 parts of xylene was thoroughly stirred to obtain an emulsifiable concentrate.

EXAMPLE 53

A mixture of 20 parts of each of the present compounds (29), (31) and (33), 10 parts of Sorpol SM–200 and 70 parts of xylene was thoroughly stirred to obtain a corresponding 20 percent emulsifiable concentrate.

EXAMPLE 54

A solution of 1 part of each of d-trans-chrysanthemate of the present compound (26) and the present compound (27) in 20 ml of methanol was homogeneously stirred and mixed with 99 parts of a mosquito coil carrier (a 3:5:1 mixture of Tabu powder, pyrethrum marc and wood powder). After vaporizing the methanol, the mixture was thoroughly kneaded with 150 ml of water and was then dried to obtain a corresponding 1 percent mosquito coil.

EXAMPLE 55

0.3 part of the present compound (26), 0.2 part of tetramethrin, 0.5 part of methoxychlor, 7 parts of xylene and 7 parts of deodorized kerosene were thoroughly mixed and dissolved together. The thus obtained solution was charged into an aerosol container. After attaching a valve portion to the container, 85 parts of a propellant (liquefied petroleum gas) was charged therein under pressure through said valve portion to obtain an aerosol.

EXAMPLE 56

0.3 part of the present compound (28), 0.3 part of Fenitrothion, 7 parts of xylene and 7.4 parts of deodorized kerosene were mixed and dissolved together, and the solution was treated in the same manner as in Example 55 to obtain an aerosol.

EXAMPLE 57

A mixture of 0.3 part of the present compound (27), 0.2 part of tetramethrin, 0.5 part of NIA–16388, 2.5 parts of chlorosene Nu (registered trade name for a product of Dow Chemical Co. which contains 1,1,1-trichloroethane as an active ingredient), 5.5 parts of deodorized kerosene and 1 part of the emulsifier Atoms 300 (registered trade name for an emulsifier produced by Atlas Chemical Co.) was emulsified by addition of 45 parts of pure water. Thereafter, the emulsion was charged into an aerosol container together with 45 parts of a 3:1 mixture of deodorized butane and deodorized propane, whereby a water-based aerosol was obtained.

EXAMPLE 58

A mixture of 1 part of each of the present compounds (26) and (28) and 5 parts NIA–16388 was dissolved in 20 parts of acetone. This solution was charged with 94 parts of 300 mesh diatomaceous earth and was thoroughly stirred and mixed in a mortar. Thereafter, the acetone was removed by vaporization to obtain a corresponding dust.

EXAMPLE 59

5 parts of the present compound (30), 5 parts of Toyolignin CT (registered trade name for a product of Toyo Boseki K.K.) and 90 parts of GSM clay (trade name for a product of Zieklite Kogyo K.K.) were throughly stirred and mixed together in a mortar. Subsequently, the mixture was charged with 10 percent the amount of said mixture of water, was further stirred, was granulated by means of a granulator and was then air-dried to obtain a granule.

EXAMPLE 60

25 parts of the present compound (32), 5 parts of Sorpol SM–200 and 70 parts of 300 mesh talc were throughly stirred and mixed together in a mortar to obtain a wettable powder.

The insecticidal effects of the present compositions thus prepared is shown in the following test examples.

TEST EXAMPLE 1

The oil sprays obtained according to Examples 35, 36, 37, 48, 49, 50 and 51, respectively, and a 0.2 percent allethrin oil spray as control, were individually sprayed in an amount of 5 ml using Campbel's turn table apparatus ["Soap and Sanitary Chemicals," Vol. 14, No. 6, 119 (1938)].

After 20 seconds from the spray, the shutter was opened, and house-fly adults (about 100 flies per group) were exposed to the mist for 10 minutes and were then transferred to an observation cage. In the cage, the flies were fed and were allowed to stand for one day at room temperature. Thereafter, the number of killed flies was counted to calculate the mortality thereof. The results are as shown in Table 2.

TABLE 2

| Composition (oil spray) | | Mortality |
|---|---|---|
| Example 35 | [Containing 0.05% of compound (1)] | 100 |
| Do | [Containing 0.05% of compound (4)] | 97 |
| Do | [Containing 0.05% of compound (6)] | 92 |
| Example 36 | [Containing 0.2% of compound (2) and 0.8% of piperonyl butoxide] | 95 |
| Do | [Containing 0.2% of compound (5) and 0.8% of piperonyl butoxide] | 90 |
| Do | [Containing 0.2% of compound (7) and 0.8% of piperonyl butoxide] | 87 |
| Do | [Containing 0.2% of compound (8) and 0.8% of piperonyl butoxide] | 75 |
| Do | [Containing 0.2% of compound (10) and 0.8% of piperonyl butoxide] | 93 |
| Example 37 | [Containing 0.2% of compound (16) and 0.8% of NIA-16388] | 100 |
| Do | [Containing 0.2% of compound (20) and 0.8% of NIA-16388] | 95 |
| Example 48 | [Containing 0.2% of compound (26)] | 98 |
| Do | [Containing 0.2% of compound (27)] | 87 |
| Do | [Containing 0.2% of compound (28)] | 82 |
| Do | [Containing 0.2% of compound (30)] | 86 |
| Do | [Containing 0.2% of compound (32)] | 85 |
| Example 49 | [Containing 0.1% of compound (29) and 0.4% of piperonyl butoxide] | 90 |
| Example 50 | [Containing 0.1% of compound (31) and 0.4% of sulfoxide] | 95 |
| Example 51 | [Containing 0.1% of compound (33) and 0.4% of MGK-264] | 87 |
| Allethrin 0.2% oil spray | | 84 |

TEST EXAMPLE 2

The emulsifiable concentrates formulated according to Example 38, 52 and 53 were respectively diluted with water to 40,000 times. 1.5 liters of the thus prepared test emulsions were charged in a styrol case of 23 cm × 30 cm with a depth of 6 cm. Into the case, about 100 larvae of northern house mosquitoes were liberated, whereby 90 percent or more of the larvae could be killed on the next day.

TEST EXAMPLE 3

About 20 northern house mosquito adults were liberated in a (70 cm)³ glass chamber. Each 1 g of the mosquito coils formulated according to Examples 39, 47 and 54 respectively, each containing the present compounds (1), (4), (5), (6), (9), (11), (12), (13), (14), (17), (19), (21), (22), (27) and d-trans-chrisanthemate of (1), (19) and (26) were ignited on both ends and were individually placed at the center in the chamber. The number of knocked-down insects was counted after 20 minutes and the knock-down percentages were calculated as more than 80 per cent in each test.

TEST EXAMPLE 4

The insecticidal effects on housefly adults of the aerosols formulated according to Examples 40, 41, 42, 43, 55, 56 and 57 were tested by the aerosol test method using Peet Grady's chamber [the method disclosed in "Soap and Chemical Specialties, Blue Book." (1965)]. The results are as shown in Table 3.

TABLE 3

| Composition | Sprayed amount (g./1,000 ft.³) | Knock-down ratio percent | | | Mortality (percent) |
|---|---|---|---|---|---|
| | | 5 min. | 10 min. | 15 min. | |
| Example 40 | 3.01 | 13 | 58 | 94 | 53 |
| Example 41 | 3.36 | 14 | 64 | 94 | 71 |
| Example 42 | 3.20 | 12 | 47 | 83 | 83 |
| Example 43 [1] | 2.87 | 11 | 45 | 83 | 67 |
| Example 55 | 3.13 | 4 | 37 | 80 | 65 |
| Example 56 | 3.28 | 5 | 38 | 86 | 68 |
| Example 57 [1] | 3.87 | 4 | 37 | 88 | 55 |

[1] Water-based aerosol.

TEST EXAMPLE 5

10 liters of water was poured into a 14 liters polypropylene bucket. Into the water, the granular preparation formulated according to Examples 45 and 59 was charged in an amount of 1 g. After 1 day, 100 full grown northern house mosquito larvae were liberated in the water, whereby more than 90 percent of the larvae could be killed within 24 hours.

TEST EXAMPLE 6

A glass Petri dish of 14 cm in inner diameter and 7 cm in height was coated on the inner wall with butter, leaving at the lower part an uncoated portion of 1 cm in height. Onto the bottom of the dish, the dusts each containing the compound (1), (4), (26) and (28) fomulated according to Examples 44 and 58 were uniformly dusted individually in a proportion of 2 g/m². Subsequently, 10 German cockroach adults were liberated in the dish and were contacted with the individual dusts for 30 minutes. After 1 day, more than 90 percent of the cockroaches were knocked-down and after 3 days, more than 90 percent of the insects could be killed.

TEST EXAMPLE 7

In 1/50,000 Wagner pots were grown rice plants which had elapsed 45 days after sowing. The emulsifiable concentrates containing the compounds (1), (6) and (30), respectively, obtained according to Examples 38 and 53, and the wettable powder formulated according to Example 46 was diluted individually with water to 400 times. The thus prepared test liquid were individually sprayed out the rice plants in a proportion of 10 ml per pot, and each pot was covered with wire net. Into the net, 30 adults of green rice leaf hoppers were liberated. After 24 hours, more than 90 percent of the hoppers could be killed in all cases.

What we claimed is:

1. A compound of the formula

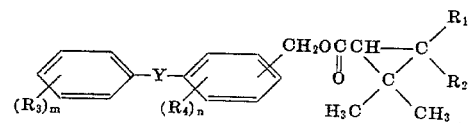

wherein Y is oxygen or sulfur, $R_1$ is hydrogen or methyl, $R_2$ is methyl, 2-methyl-1-propenyl or 2-methoxycarbonyl-1-propenyl when $R_1$ is hydrogen, or methyl when $R_1$ is methyl, $R_3$ and $R_4$ are the same or different and are halogen or methyl and $m$ is 0 or an integer or 1 to 3, and $n$ is 0 or an integer of 1 to 2.

2. A compound according to claim 1, wherein $R_1$ is hydrogen and $R_2$ is 2-methyl-1-propenyl.

3. A compound according to claim 2, wherein Y is oxygen.

4. A compound according to claim 1, wherein $R_1$ and $R_2$ are methyl, respectively.

5. A compound according to claim 4, wherein Y is oxygen.

6. A compound according to claim 1, wherein Y is sulfur.

7. A compound of the formula

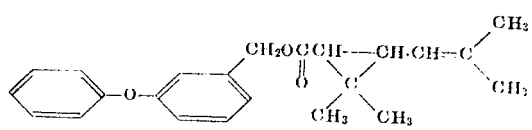

8. A compound of the formula
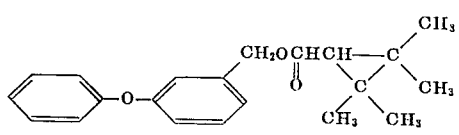
9. A compound of the formula
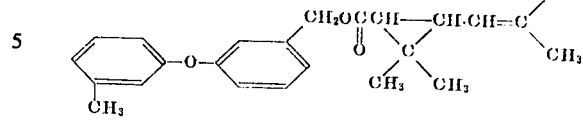
* * * * *

UNITED STATES PATENT OFFICE
CERTIFICATE OF CORRECTION

Patent No. 3,666,789                    Dated May 30, 1972

Inventor(s) Itaya et al.

It is certified that error appears in the above-identified patent and that said Letters Patent are hereby corrected as shown below:

Please make the following corrections:

In Section [72]: change the spelling of the seventh inventor's name to read --Keimei Fujimoto--.

Please insert the following missing claim for priority:

--Japanese No. 37443/68 filed May 31, 1968;
Japanese No. 38157/68 filed June 3, 1968;
Japanese No. 42646/68 filed June 10, 1968;
Japanese No. 45210/68 filed June 17, 1968--

Signed and sealed this 6th day of February 1973.

(SEAL)
Attest:

EDWARD M. FLETCHER, JR.          ROBERT GOTTSCHALK
Attesting Officer                Commissioner of Patents

UNITED STATES PATENT OFFICE
CERTIFICATE OF CORRECTION

Patent No. 3,666,789  Dated May 30, 1972

Inventor(s) ITAYA et al

It is certified that error appears in the above-identified patent and that said Letters Patent are hereby corrected as shown below:

In Columns 13 -14, Example 22, the starting material should read --dl-cis, trans- -- and not "d-cis, trans-".

Signed and sealed this 9th day of July 1974.

(SEAL)
Attest:

McCOY M. GIBSON, JR.
Attesting Officer

C. MARSHALL DANN
Commissioner of Patents